United States Patent
Yoon et al.

(10) Patent No.: US 7,581,869 B2
(45) Date of Patent: Sep. 1, 2009

(54) BACKLIGHT ASSEMBLY AND DISPLAY DEVICE HAVING THE SAME

(75) Inventors: Ju-Young Yoon, Seoul (KR); Eun-Jeong Kang, Cheonan-si (KR); Gi-Cherl Kim, Yongin-si (KR); Moon-Hwan Chang, Cheonan-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 0 days.

(21) Appl. No.: 11/924,967

(22) Filed: Oct. 26, 2007

(65) Prior Publication Data
US 2008/0101093 A1   May 1, 2008

(30) Foreign Application Priority Data
Oct. 26, 2006 (KR) .................. 10-2006-0104550

(51) Int. Cl.
    *F21V 7/04* (2006.01)
(52) U.S. Cl. .............. 362/630; 362/613; 362/618; 349/65; 349/67
(58) Field of Classification Search ........... 362/33, 362/97, 555, 561, 600, 606, 612, 613, 615, 362/630, 631, 633, 634; 349/58, 61, 64, 349/65
See application file for complete search history.

(56) References Cited

U.S. PATENT DOCUMENTS

| | | | | |
|---|---|---|---|---|
| 5,883,684 | A * | 3/1999 | Millikan et al. | 349/65 |
| 7,052,168 | B2 * | 5/2006 | Epstein et al. | 362/625 |
| 7,201,493 | B2 * | 4/2007 | Martynov et al. | 362/231 |
| 7,220,040 | B2 * | 5/2007 | Lengyel et al. | 362/612 |
| 7,344,291 | B2 * | 3/2008 | Hatanaka et al. | 362/610 |
| 2005/0185421 | A1* | 8/2005 | Hayakawa | 362/612 |
| 2006/0268194 | A1* | 11/2006 | Morimoto et al. | 349/65 |
| 2007/0159845 | A1* | 7/2007 | Hirota et al. | 362/600 |
| 2008/0123023 | A1* | 5/2008 | Doan et al. | 349/70 |

FOREIGN PATENT DOCUMENTS

| | | | | |
|---|---|---|---|---|
| JP | 2001133756 | A | * | 5/2001 |
| JP | 2006210183 | A | * | 8/2006 |
| WO | WO 009218213 | A | * | 10/1992 |

* cited by examiner

*Primary Examiner*—Hargobind S Sawhney
(74) *Attorney, Agent, or Firm*—F. Chau & Associates, LLC.

(57) ABSTRACT

A backlight assembly includes a light guiding plate, a driving board, a light emitting chip and a flexible board. The light guiding plate has a plate shape. The driving board is disposed substantially parallel with a side surface of the light guiding plate to face the side surface of the light guiding plate. The light emitting chip is formed on a surface of the driving board to generate light toward the side surface of the light guiding plate. The flexible board has a connection wiring that provides a power source to the driving board. The driving board is disposed on the flexible board.

20 Claims, 7 Drawing Sheets

BACKLIGHT ASSEMBLY AND DISPLAY DEVICE HAVING THE SAME

CROSS-REFERENCE TO RELATED APPLICATION

This application claims priority to Korean Patent Application No. 2006-104550 filed on Oct. 26, 2006, the contents of which are herein incorporated by reference in their entireties.

BACKGROUND OF THE INVENTION

1. Technical Field

The present invention relates to a backlight assembly and a display device having the backlight assembly, and more particularly, to a backlight assembly capable of reducing a bezel size and a display device having the backlight assembly.

2. Discussion of the Related Art

A liquid crystal display (LCD) device includes an LCD panel displaying an image by using optical characteristics of a liquid crystal layer, and a backlight assembly disposed under the LCD panel to provide light to the LCD panel.

The backlight assembly includes a light source generating light, a light guiding plate upwardly guiding the light from the light source, an optical sheet disposed over the light guiding plate to improve optical characteristics of the light exiting the light guiding plate, and a receiving container receiving the light source, the light guiding plate and the optical sheet.

A light emitting diode (LED) acts as the light source to reduce the size of the backlight assembly. The LED is mounted on a driving board to generate light. Instead of one LED, a plurality of LEDs may be packaged to be mounted on the driving board.

The driving board having the LED package is disposed adjacent to a side surface of the light guiding plate. Since the LED package has a predetermined volume, the driving board is disposed substantially perpendicular to the side surface of the light guiding plate.

However, when the driving board is disposed substantially perpendicular to the side surface of the light guiding plate, a bezel of the LCD device has an increased size due to a width of the driving board. Since a plurality of wirings is formed on the driving board to provide a power source to the LED package, when the wirings are complicated, the width of the driving board increases, thereby increasing the bezel size of the LCD device.

SUMMARY OF THE INVENTION

Embodiments of the present invention provide a backlight assembly capable of changing a position of a driving board to reduce a bezel size and a display device having the backlight assembly.

In an exemplary embodiment of the present invention, a backlight assembly includes a light guiding plate, a driving board, a light emitting chip and a flexible film.

The light guiding plate has a plate shape. The driving board is disposed substantially parallel with a side surface of the light guiding plate to face the side surface of the light guiding plate. The light emitting chip is formed on a surface of the driving board to generate light toward the side surface of the light guiding plate. The flexible film has a connection wiring that provides a power source to the driving board. The driving board is disposed on the flexible film.

In an embodiment, a width of the driving board is less than or substantially equal to a thickness of the light guiding plate, and the flexible film has a larger area than the driving board.

The flexible film may include a board-mounted portion on which the driving board is disposed and a extended portion extending from the board-mounted portion, and the connection wiring may be formed on the board-mounted portion and the extended portion. The extended portion may be bent substantially perpendicular to the board-mounted portion.

In an embodiment of the present invention, a display device includes a display panel displaying an image and a backlight assembly providing light to the display panel.

The backlight assembly includes a light guiding plate, a driving board, a light emitting chip and a flexible film. The light guiding plate has a plate shape. The driving board is disposed substantially parallel with a side surface of the light guiding plate to face the side surface of the light guiding plate. The light emitting chip is formed on a surface of the driving board to generate light toward the side surface of the light guiding plate. The flexible film has a connection wiring that provides a power source to the driving board. The driving board is disposed on the flexible film.

According to exemplary embodiments of the present invention, a driving board is disposed on a flexible film to be substantially parallel with and to face a side surface of a light guiding plate, thereby reducing a bezel size.

BRIEF DESCRIPTION OF THE DRAWINGS

Exemplary embodiments of the present invention can be understood in more detail from the following descriptions taken in conjunction with the accompanying drawings, in which.

DESCRIPTION OF THE EXEMPLARY EMBODIMENTS

Figure 1:
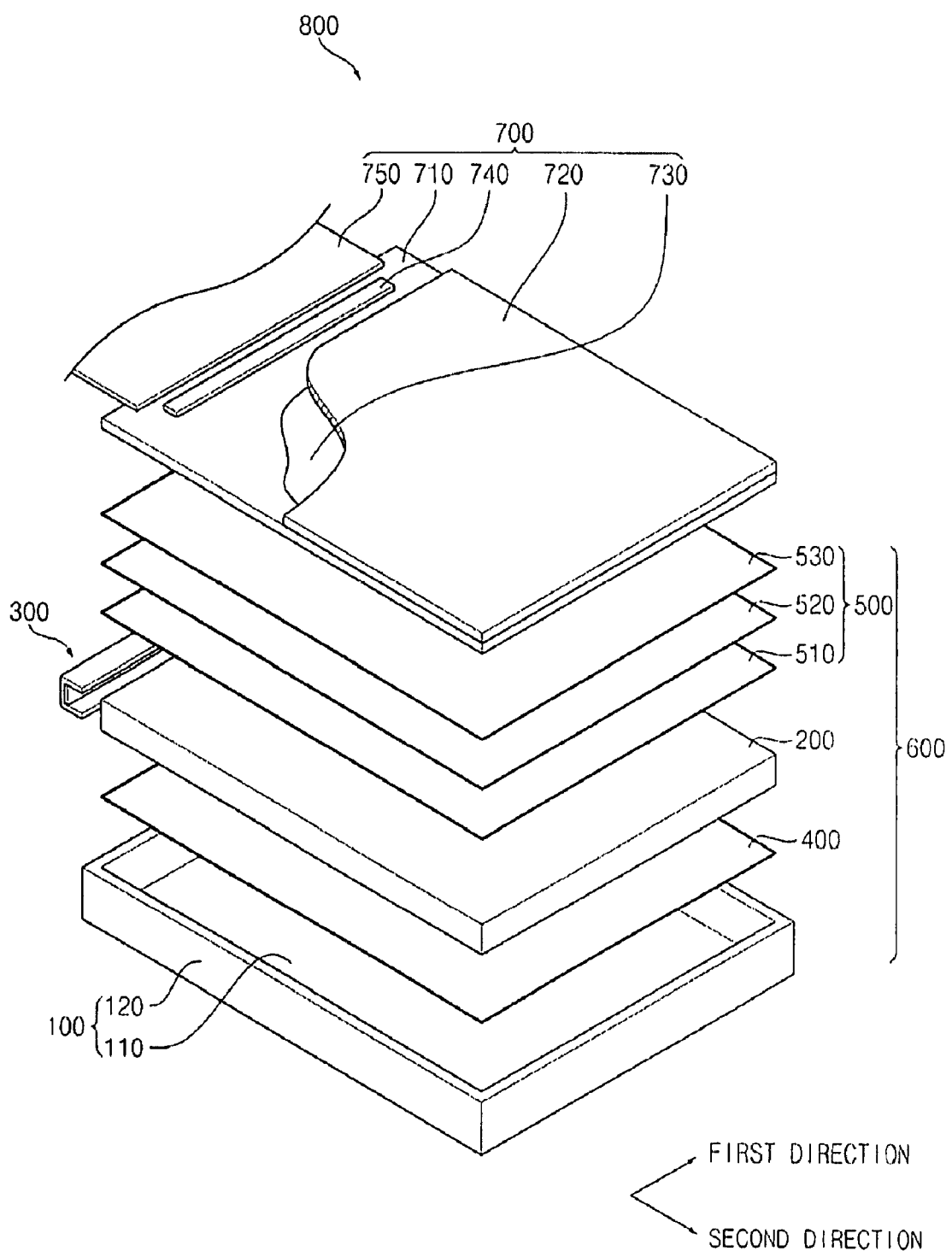
FIG. 1 is an exploded perspective view illustrating a display device according to an exemplary embodiment of the present invention.

Exemplary embodiments of the present invention are described more fully hereinafter with reference to the accompanying drawings, in which embodiments of the invention are shown. This invention may, however, be embodied in many different forms and should not be construed as limited to the embodiments set forth herein. It will be understood that when an element is referred to as being "on" or "onto" another element, it may be directly on the other element or intervening elements may also be present. Like reference numerals may refer to similar or identical elements throughout.

FIG. 1 is an exploded perspective view illustrating a display device according to an exemplary embodiment of the present invention.

Referring to FIG. 1, a display device 800 according to an exemplary embodiment includes a backlight assembly 600 generating light and a display panel 700 disposed over the backlight assembly 600 to display an image.

The backlight assembly 600 includes a receiving container 100, a light guiding plate 200, a light generating unit 300, a reflective sheet 400 and an optical sheet group 500.

The receiving container 100 includes a bottom portion 110 and a side portion 120 to form a receiving space. The receiving container 100 receives the light guiding plate 200, the light generating unit 300, the reflective sheet 400 and an optical sheet group 500.

The light guiding plate 200 may have, for example, a plate shape such as a rectangular parallelepiped shape. The light guiding plate 200 may have a rectangular parallelepiped shape that extends in a first direction and a second direction substantially perpendicular to the first direction.

The light generating unit 300 faces a side surface of the light guiding plate 200. The light generating unit 300 generates light to the side surface of the light guiding plate. The light that is incident onto the side surface of the light guiding plate is guided into the light guiding plate 200 and upwardly exits the light guiding plate 200.

The light generating unit 300 is disposed to face one of four side surfaces of the light guiding plate 200. In an embodiment, two light generating units 300 may be disposed to face two side surfaces of the light guiding plate 200.

In FIG. 1, the light generating unit 300 is disposed to face a short side surface of the light guiding plate 200. Alternatively, the light generating unit 300 may be disposed to face a long side surface of the light guiding plate 200.

The reflective sheet 400 reflects light downwardly exiting the light guiding plate 200, and the light may be incident into the light guiding plate 200. Thus, optical efficiency of the light generated from the light generating unit 300 may increase. In an embodiment, the bottom portion 110 of the receiving container 100 may act as a reflecting member, instead of the reflective sheet 400. When a reflective material is coated on the bottom portion 110 of the receiving container 100, the bottom portion 110 may reflect the light downwardly exiting the light guiding plate 300.

The optical sheet group 500 is disposed over the light guiding plate 200 to improve optical characteristics of light upwardly exiting the light guiding plate 300. The optical sheet group 500 may include a light-diffusing sheet 510, a first prism sheet 520 and a second prism sheet 530.

The light-diffusing sheet 510 diffuses light to improve luminance uniformity. The first prism sheet 520 and the second prism sheet 530 improve front-luminance of light. The first prism sheet 520 has a first prism pattern (not shown) that is longitudinally formed in the first direction, and the second prism sheet 530 has a second prism pattern (not shown) that is longitudinally formed in the second direction substantially perpendicular to the first direction.

The display panel 700 is disposed over the backlight assembly 600 to display an image by using light. The display panel 700 may include a first substrate 710, a second substrate 720, a liquid crystal layer 730, a driver chip 740 and a flexible printed circuit board 750.

The first substrate 710 includes a plurality of pixel electrodes arranged in a matrix, a plurality of thin film transistors (TFTs) applying a driving voltage to the plurality of pixel electrodes, and a plurality of signal lines for driving the TFTs.

The second substrate 720 faces the first substrate 710. The second substrate 720 may include a common electrode including transparent conductive material and a plurality of color filters facing the pixel electrodes. The color filters may include a red color filter, a green color filter and a blue color filter.

The liquid crystal layer 730 is interposed between the first substrate 710 and the second substrate 720. An electric field is generated between the pixel electrode and the common electrode to rearrange liquid crystal molecules of the liquid crystal layer 730. The rearranged liquid crystal molecules of the liquid crystal layer 730 adjusts optical transmissivity of the light generated from the backlight assembly 600, and the light passes through the color filters to externally display an image.

The driver chip 740 is disposed, for example, on the first substrate 710. The driver chip 740 is electrically connected to the signal lines of the first substrate 710 and controls the TFTs to display an image.

The flexible printed circuit board 750 partially overlaps the first substrate 710, and is electrically connected to the first substrate 710. The flexible printed circuit board 750 generates a control signal controlling the driver chip 740, and the driver chip 740 may be controlled by using the control signal.

Although not shown in FIG. 1, the display panel 700 may further include a printed circuit board (not shown) that is electrically connected to the flexible printed circuit board 750 to control the driver chip 740.

Figure 2:
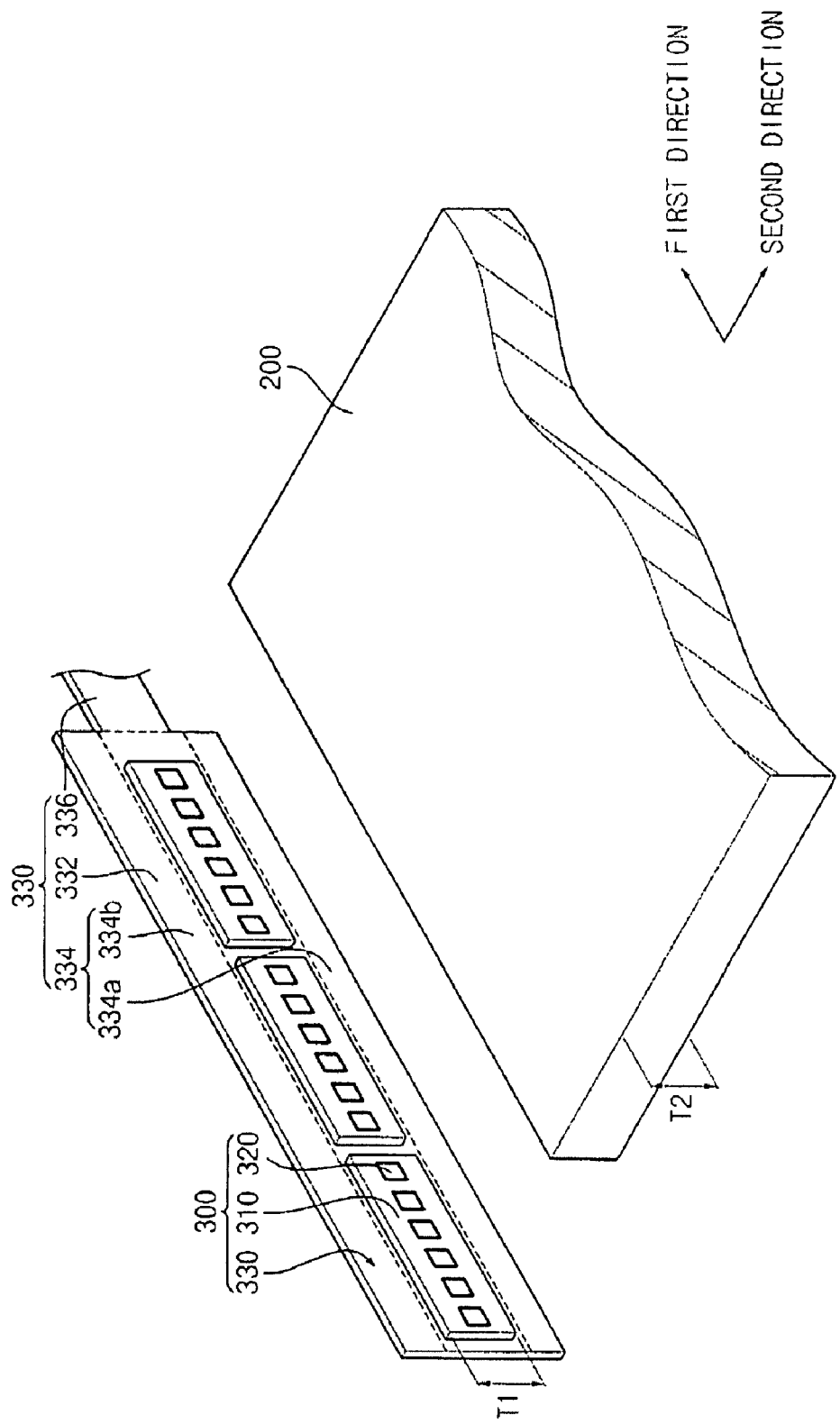
FIG. 2 is a perspective view illustrating a light generating unit and a light guiding plate of the display device in FIG. 1.
Figure 3:
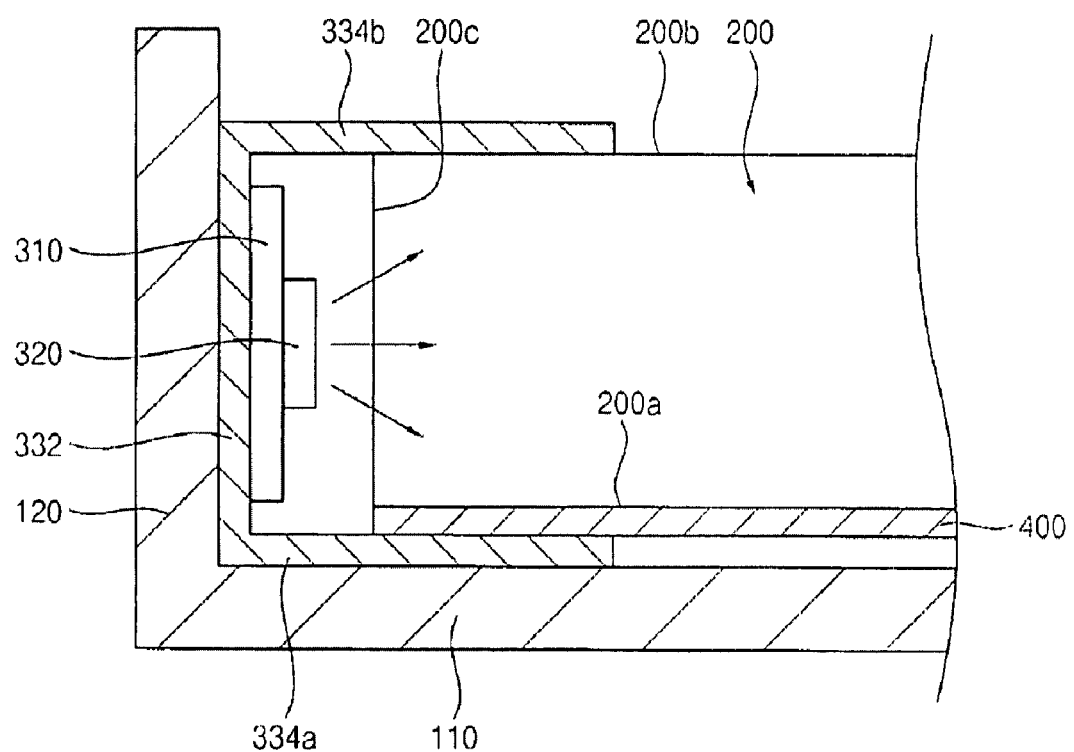
FIG. 3 is a partial cross-sectional view illustrating a backlight assembly of the display device illustrated in FIG. 1.

FIG. 2 is a perspective view illustrating a light generating unit and a light guiding plate of the display device in FIG. 1. FIG. 3 is a partial cross-sectional view illustrating a backlight assembly of the display device illustrated in FIG. 1.

Referring to FIGS. 2 and 3, the light guiding plate 200 has, for example, a rectangular parallelepiped shape, and includes a lower surface 200*a*, an upper surface 200*b* and four side surfaces. The light generating unit 300 faces one side surface 200*c* of the side surfaces of the light guiding plate 200.

The light generating unit 300 may include a driving board 310, a light emitting chip 320 and a flexible film 330. The light generating unit 300 generates light, and the light is incident onto the side surface 200*c* of the light guiding plate 200.

The driving board 310 is disposed substantially parallel with the side surface 200*c* of the light guiding plate 200 to face the side surface 200*c* of the light guiding plate 200. The driving board 310 has, for example, a plate shape that longitudinally extends in the first direction. The driving board 310 is disposed substantially parallel with the side surface 200*c* of the light guiding plate 200, and disposed to face the side surface 200*c* of the light guiding plate 200. A surface of the driving board 310 faces the side surface 200*c* of the light guiding plate 200. A width T1 of the driving board 310 may be less than or substantially equal to a thickness T2 of the light guiding plate 200.

A plurality of driving boards 310 may be disposed along the first direction. For example, in FIG. 2, three driving boards 310 are disposed in a line shape. The plurality of driving boards 310 may be disposed to have substantially the same length as a length of the side surface 200*c* of the light guiding plate 200. The driving board 310 may include, for example, a synthetic resin having hardness. Alternatively, the driving board 310 may include a synthetic resin having softness or flexibility.

The light emitting chip 320 is disposed on a surface of the driving board 310. In an embodiment, a plurality of light emitting chips 320 is disposed in a line shape along a longitudinal direction of the driving board 310, which corresponds to the first direction. The light emitting chips 320 receive a power source from the driving board 310 and generate light.

The light emitting chip 320 includes a red light emitting chip that generates red light, a green light emitting chip that generates green light and a blue light emitting chip that generates blue light. The red light, the green light and the blue light are mixed to generate white light. In an embodiment, the light emitting chip 320 may include white light emitting chip that generates white light.

Each light emitting chip 320 may have a substantially square shape viewed from a plan view. For example, each light emitting chip 320 has a size of about 0.35 mm×0.35 mm.

The flexible film 330 is disposed at a surface of the driving board 310, and includes a connection wiring that provides a power source to the driving board 310.

The flexible film 330 has flexibility, and has a larger area than the driving board 310. In an embodiment, the flexible film 330 includes a board-mounted portion 332, a extended portion 334 and a power connection portion 336.

The driving board 310 is mounted on a surface of the board-mounted portion 332. In an embodiment, first connection pads (not shown) are formed on a surface of the driving board 310, and second connection pads (not shown) are formed on a surface of the board-mounted portion 332, which faces the surface of the driving board 310, corresponding to the first connection pads. The first and second connection pads may be electrically connected to each other through, for example, lead (Pb).

The extended portion 334 extends from the board-mounted portion 332. Since the flexible film 330 has flexibility, the extended portion 334 may be bent from the board-mounted portion 332. The extended portion 334 is, for example, substantially perpendicular to the board-mounted portion 332.

The extended portion 334 includes a first sub extended portion 334a and a second sub extended portion 334b.

The first sub extended portion 334a downwardly extends from the board-mounted portion 332. In contrast, the second sub extended portion 334b upwardly extends from the board-mounted portion 332. Thus, the first sub extended portion 334a and the second sub extended portion 334b are formed at a lower side and an upper side of the board-mounted portion 332, respectively.

The first sub extended portion 334a is bent with respect to the board-mounted portion 332 to partially overlap the lower surface 200a of the light guiding plate 200. The second sub extended portion 334b is bent with respect to the board-mounted portion 332 to partially overlap the upper surface 200a of the light guiding plate 200.

In an embodiment, the first sub extended portion 334a partially overlaps the reflective sheet 400 to be disposed under the reflective sheet 400. The reflective sheet 400 may be disposed between the first sub extended portion 334a and the lower surface 200a of the light guiding plate 200.

In FIG. 3, the first sub extended portion 334a and the second sub extended portion 334b have substantially the same extension length from the board-mounted portion 332. Alternatively, the first sub extended portion 334a and the second sub extended portion 334b may have a different extension length from the board-mounted portion 332 from each other. In an embodiment, an extension length of the first sub extended portion 334a is longer than that of the second sub extended portion 334b.

The power connection portion 336 is electrically connected to at least one of the board-mounted portion 332 and the extended portion 334, and electrically connected to an externally provided power supply part (not shown). In an embodiment, the power connection portion 336 extends from the board-mounted portion 332 in the first direction. Alternatively, the power connection portion 336 may extend from the extended portion 334 in the first direction.

A reflective layer (not shown) may be formed on a surface of the extended portion 334 to reflect light. The reflective layer reflects the light generated from the light emitting chip 320 to guide the reflected light to the side surface of the light guiding plate.

Figure 4:
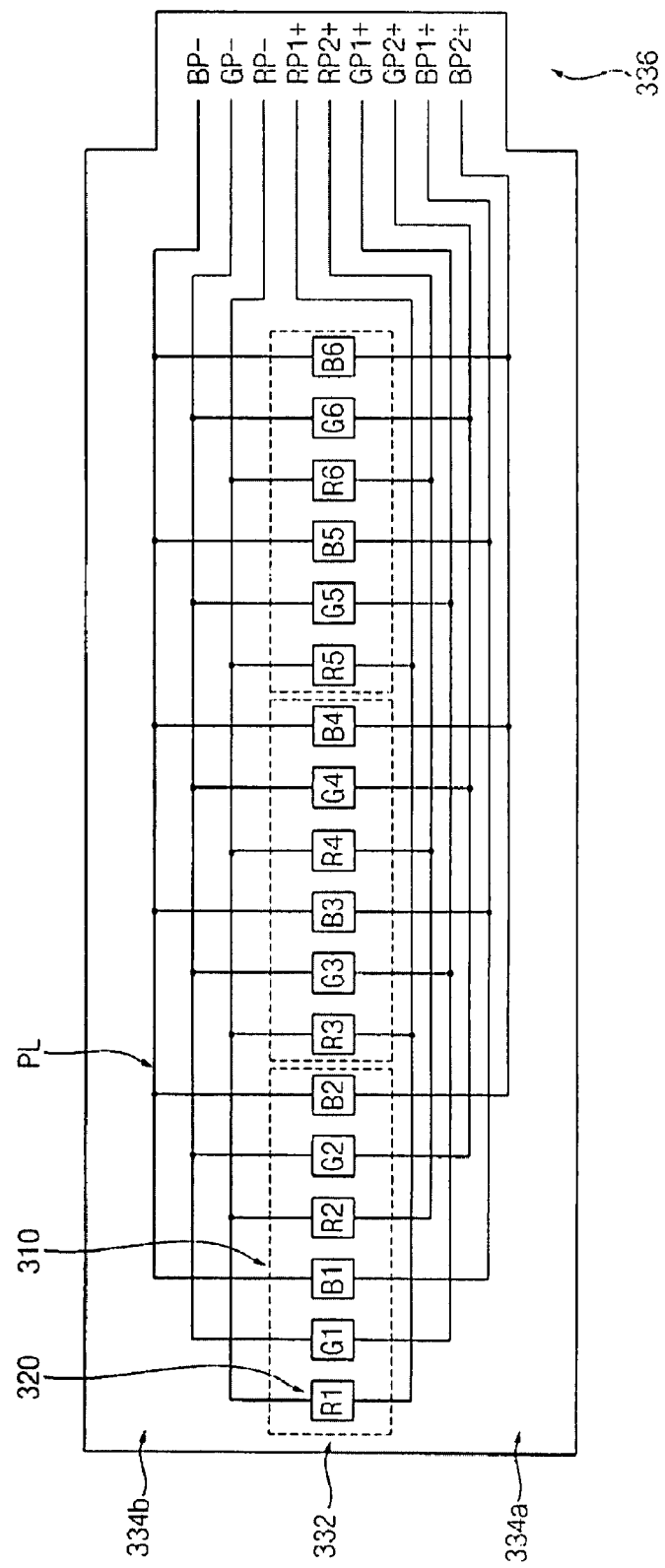
FIG. 4 is a plan view illustrating an electrical connection of the light generating unit in FIG. 1 according to an exemplary embodiment of the present invention.

FIG. 4 is a plan view illustrating an electrical connection of the light generating unit in FIG. 1 according to an exemplary embodiment of the present invention.

Referring to FIG. 4, a connection wiring PL is formed on the flexible film 330 to provide a power source to the driving board 310. The connection wiring PL is formed on the board-mounted portion 332, the extended portion 334 and the power connection portion 336.

The connection wiring PL is electrically connected to the second connection pad of the board-mounted portion 332, and extends to the extended portion 334 and the power connection portion 336 to be electrically connected to the external power supply part.

A plurality of light emitting chips 320 may be linearly formed along the longitudinal direction of the driving board 310. The light emitting chips 320 are electrically connected to the external power supply part through the connection wiring PL to generate light. The light emitting chips 320 may be electrically connected to the connection wiring PL in series or in parallel. Alternatively, the light emitting chips 320 may be electrically connected to the connection wiring PL in a mixed form of series and parallel connections.

In FIG. 4, a red light emitting chip, a green light emitting chip and a blue light emitting chip are linearly disposed on the driving board 310 by turns, along the longitudinal direction of the driving board 310. In an embodiment, the light emitting chips 320 include a first red light emitting chip R1, a first green light emitting chip G1, a first blue light emitting chip B1, a second red light emitting chip R2, a second green light emitting chip G2, a second blue light emitting chip B2, a third red light emitting chip R3, a third green light emitting chip G3, a third blue light emitting chip B3, a fourth red light emitting chip R4, a fourth green light emitting chip G4, a fourth blue light emitting chip B4, a fifth red light emitting chip R5, a fifth green light emitting chip G5, a fifth blue light emitting chip B5, a sixth red light emitting chip R6, a sixth green light emitting chip G6, and a sixth blue light emitting chip B6, which are successively disposed.

The first red light emitting chip R1, the third red light emitting chip R3 and the fifth red light emitting chip R5 may be electrically connected to the connection wiring PL in parallel, and the second red light emitting chip R2, the fourth red light emitting chip R4 and the sixth red light emitting chip R6 may be electrically connected to the connection wiring PL in parallel.

Particularly, first ends of the first red light emitting chip R1, the third red light emitting chip R3 and the fifth red light emitting chip R5 are electrically connected to a first red positive electrode RP1+ through the connection wiring PL, and first ends of the second red light emitting chip R2, the fourth red light emitting chip R4 and the sixth red light emitting chip R6 are electrically connected to a second red positive electrode RP2+ through the connection wiring PL. Second ends of the first red light emitting chip R1, the second red light emitting chip R2, the third red light emitting chip R3, the fourth red light emitting chip R4, the fifth red light emitting chip R5 and the sixth red light emitting chip R6 are electrically connected to a red negative electrode RP1− through the connection wiring PL.

The first green light emitting chip G1, the third green light emitting chip G3 and the fifth green light emitting chip G5 may be electrically connected to the connection wiring PL in parallel, and the second green light emitting chip G2, the fourth green light emitting chip G4 and the sixth green light emitting chip G6 may be electrically connected to the connection wiring PL in parallel.

Particularly, first ends of the first green light emitting chip G1, the third green light emitting chip G3 and the fifth green light emitting chip G5 are to electrically connected to a first green positive electrode GP1+ through the connection wiring PL, and first ends of the second green light emitting chip G2, the fourth green light emitting chip G4 and the sixth green light emitting chip G6 are electrically connected to a second green positive electrode GP2+ through the connection wiring PL. Second ends of the first green light emitting chip G1, the second green light emitting chip G2, the third green light emitting chip G3, the fourth green light emitting chip G4, the fifth green light emitting chip G5 and the sixth green light emitting chip G6 are electrically connected to a green negative electrode GP1− through the connection wiring PL.

The first blue light emitting chip B1, the third blue light emitting chip B3 and the fifth blue light emitting chip B5 may be electrically connected to the connection wiring PL in parallel, and the second blue light emitting chip B2, the fourth blue light emitting chip B4 and the sixth blue light emitting chip B6 may be electrically connected to the connection wiring PL in parallel.

Particularly, first ends of the first blue light emitting chip B1, the third blue light emitting chip B3 and the fifth blue light emitting chip B5 are electrically connected to a first blue positive electrode BP1+ through the connection wiring PL, and first ends of the second blue light emitting chip B2, the fourth blue light emitting chip B4 and the sixth blue light emitting chip B6 are electrically connected to a second blue positive electrode BP2+ through the connection wiring PL. Second ends of the first blue light emitting chip B1, the second blue light emitting chip B2, the third blue light emitting chip B3, the fourth blue light emitting chip B4, the fifth blue light emitting chip B5 and the sixth blue light emitting chip B6 are electrically connected to a blue negative electrode BP1− through the connection wiring PL.

Figure 5:
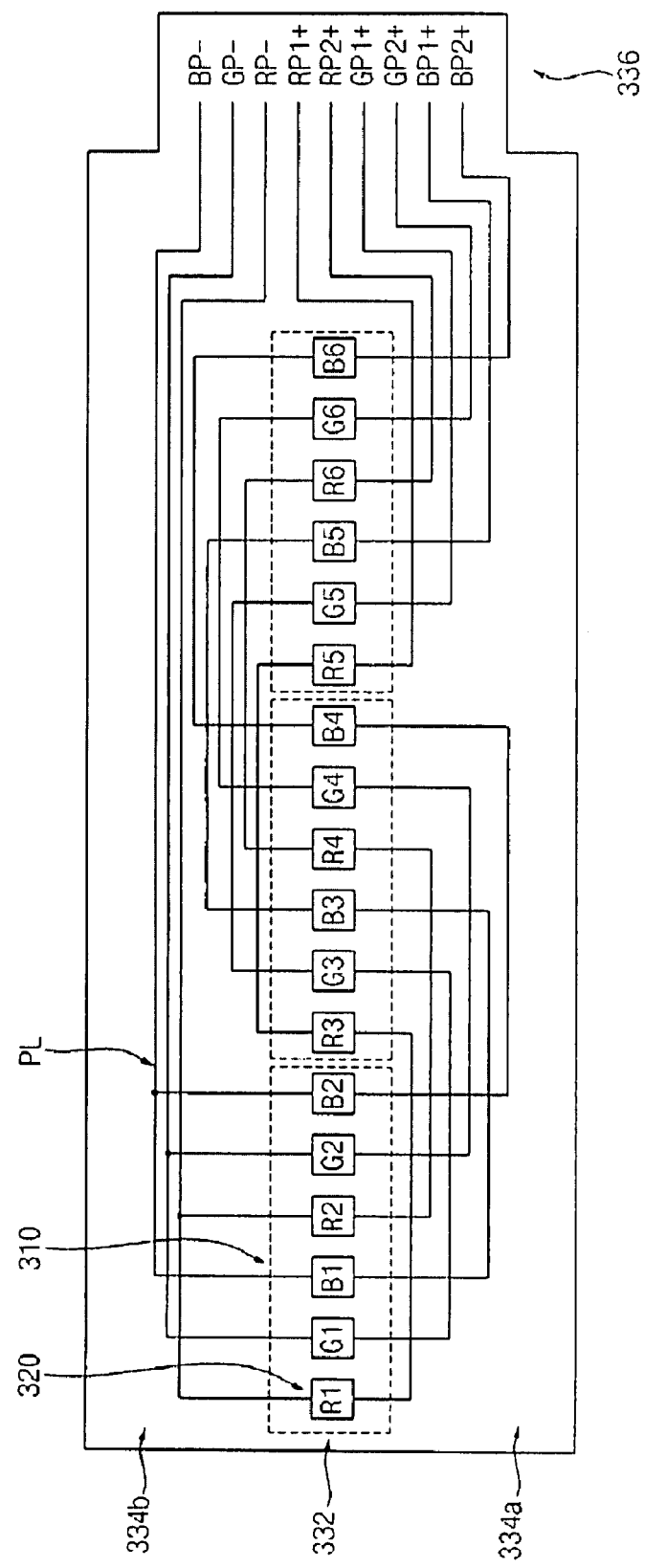
FIG. 5 is a plan view illustrating an electrical connection of the light generating unit in FIG. 1 according to an exemplary embodiment of the present invention.

FIG. 5 is a plan view illustrating an electrical connection of the light generating unit in FIG. 1 according to an exemplary embodiment of the present invention.

Referring to FIG. 5, the light emitting chips 320 may have an electrical connection according to an exemplary embodiment of the present invention.

The first red light emitting chip R1, the third red light emitting chip R3 and the fifth red light emitting chip R5 may be electrically connected to the connection wiring PL in series, and the second red light emitting chip R2, the fourth red light emitting chip R4 and the sixth red light emitting chip R6 may be electrically connected to the connection wiring PL in series. The first green light emitting chip G1, the third green light emitting chip G3 and the fifth green light emitting chip G5 may be electrically connected to the connection wiring PL in series, and the second green light emitting chip G2, the fourth green light emitting chip G4 and the sixth green light emitting chip G6 may be electrically connected to the connection wiring PL in series. The first blue light emitting chip B1, the third blue light emitting chip B3 and the fifth blue light emitting chip B5 may be electrically connected to the connection wiring PL in series, and the second blue light emitting chip B2, the fourth blue light emitting chip B4 and the sixth blue light emitting chip B6 may be electrically connected to the connection wiring PL in series.

Particularly, a first end of the first red light emitting chip R1 is electrically connected to a first end of the third red light emitting chip R3, a second end of the third red light emitting chip R3 is electrically connected to a first end of the fifth red light emitting chip R5, and a second end of the fifth red light emitting chip R5 is electrically connected to the first red positive electrode RP1+.

A first end of the second red light emitting chip R2 is electrically connected to a first end of the fourth red light emitting chip R4, a second end of the fourth red light emitting chip R4 is electrically connected to a first end of the sixth red light emitting chip R6, and a second end of the sixth red light emitting chip R6 is electrically connected to the second red positive electrode RP2+.

A second end of the first red light emitting chip R1 and a second end of the second red light emitting chip R2 are electrically connected to the red negative electrode RP1− through the connection wiring PL.

In addition, a first end of the first green light emitting chip G1 is electrically connected to a first end of the third green light emitting chip G3, a second end of the third green light emitting chip G3 is electrically connected to a first end of the fifth green light emitting chip G5, and a second end of the fifth green light emitting chip G5 is electrically connected to the first green positive electrode GP1+.

A first end of the second green light emitting chip G2 is electrically connected to a first end of the fourth green light emitting chip G4, a second end of the fourth green light emitting chip G4 is electrically connected to a first end of the sixth green light emitting chip G6, and a second end of the sixth green light emitting chip G6 is electrically connected to the second green positive electrode GP2+.

A second end of the first green light emitting chip G1 and a second end of the second green light emitting chip G2 are electrically connected to the green negative electrode GP1− through the connection wiring PL.

In addition, a first end of the first blue light emitting chip B1 is electrically connected to a first end of the third blue light emitting chip 83, a second end of the third blue light emitting chip B3 is electrically connected to a first end of the fifth blue light emitting chip B5, and a second end of the fifth blue light emitting chip B5 is electrically connected to the first blue positive electrode BP1+.

A first end of the second blue light emitting chip B2 is electrically connected to a first end of the fourth blue light emitting chip B4, a second end of the fourth blue light emitting chip B4 is electrically connected to a first end of the sixth blue light emitting chip B6, and a second end of the sixth blue light emitting chip B6 is electrically connected to the second blue positive electrode BP2+.

A second end of the first blue light emitting chip B1 and a second end of the second blue light emitting chip B2 are electrically connected to the blue negative electrode BP1− through the connection wiring PL.

According to an exemplary embodiment of the present embodiment, the driving board 310 having the light emitting chip 320 is disposed substantially parallel with the side surface 200c of the light guiding plate 200 to face the side surface 200c of the light guiding plate 200. Thus, a distance between the driving board 310 and the light guiding plate 200 is reduced, thereby reducing the bezel size of the display device 800.

The light emitting chips 320 are electrically connected in series and/or in parallel through the connection wiring PL. In order for the driving board 310 to be disposed substantially parallel with the side surface 200c of the light guiding plate 200 to face the side surface 200c of the light guiding plate 200, a width T1 of the driving board 310 may be less than or substantially equal to a thickness T2 of the light guiding plate 200.

However, since the light guiding plate 200 has a thin thickness, about 2 mm, a width of the driving board 310 may be reduced. Thus, the connection wiring PL having a complicated configuration may not be formed on the driving board 310.

Accordingly, according to an exemplary embodiment of the present embodiment, the connection wiring PL is formed not on the driving board 310, but on the flexible film 330 having a larger area than the driving board 310. In an embodiment, the connection wiring PL is formed on the flexible film 330, and the driving board 310 is formed on a surface of the flexible film 330 to be electrically connected to the connection wiring PL, thereby increasing an area for forming the connection wiring PL.

The connection wiring PL may be formed on both surfaces of the flexible film 330 to increase an area for forming the connection wiring PL. Also, when the flexible film 330 has a plurality of sub boards successively formed thereon, an area for forming the connection wiring PL may be increased.

Figure 6:
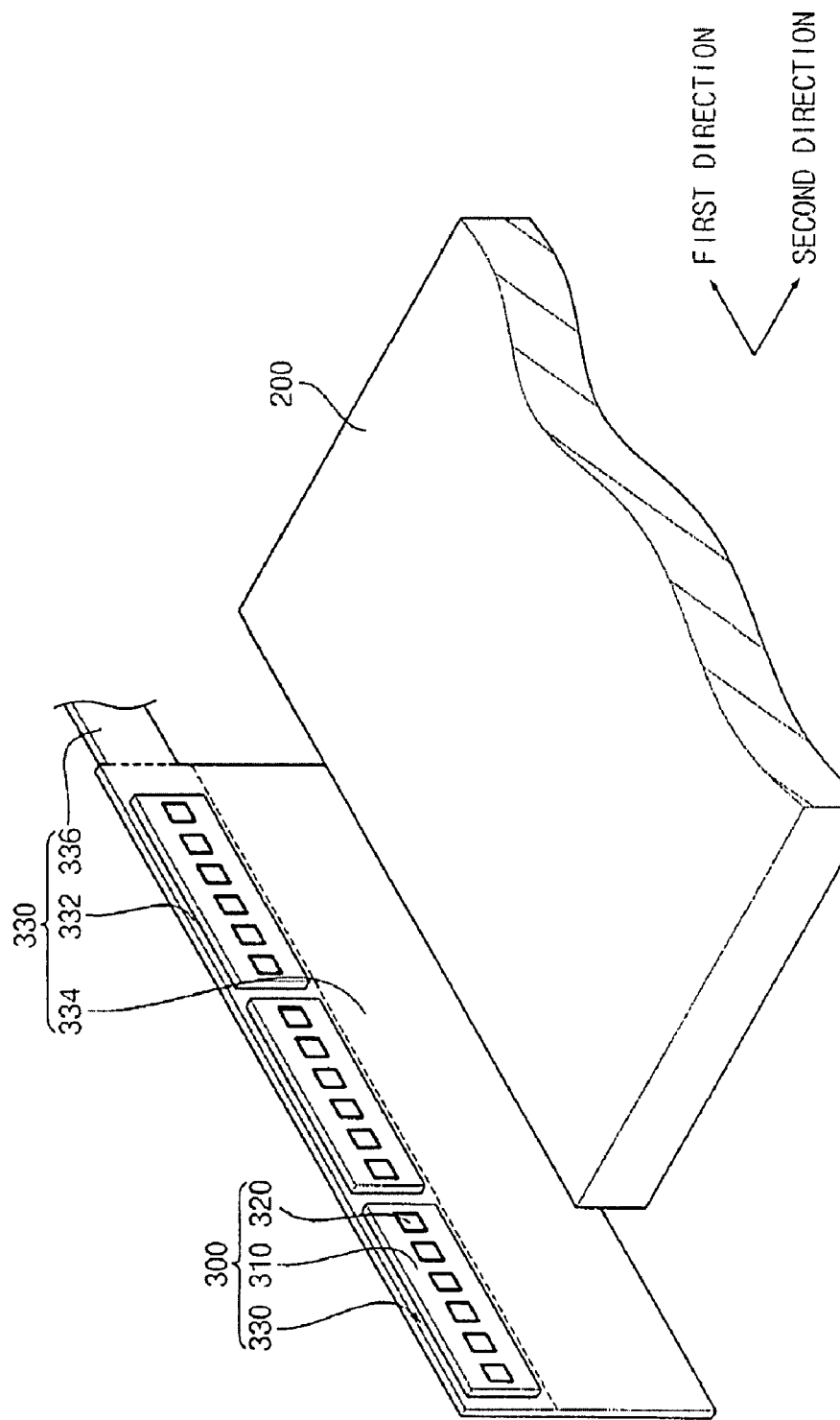
FIG. 6 is a perspective view illustrating a light generating unit and a light guiding plate of a display device according to an exemplary embodiment of the present invention.
Figure 7:
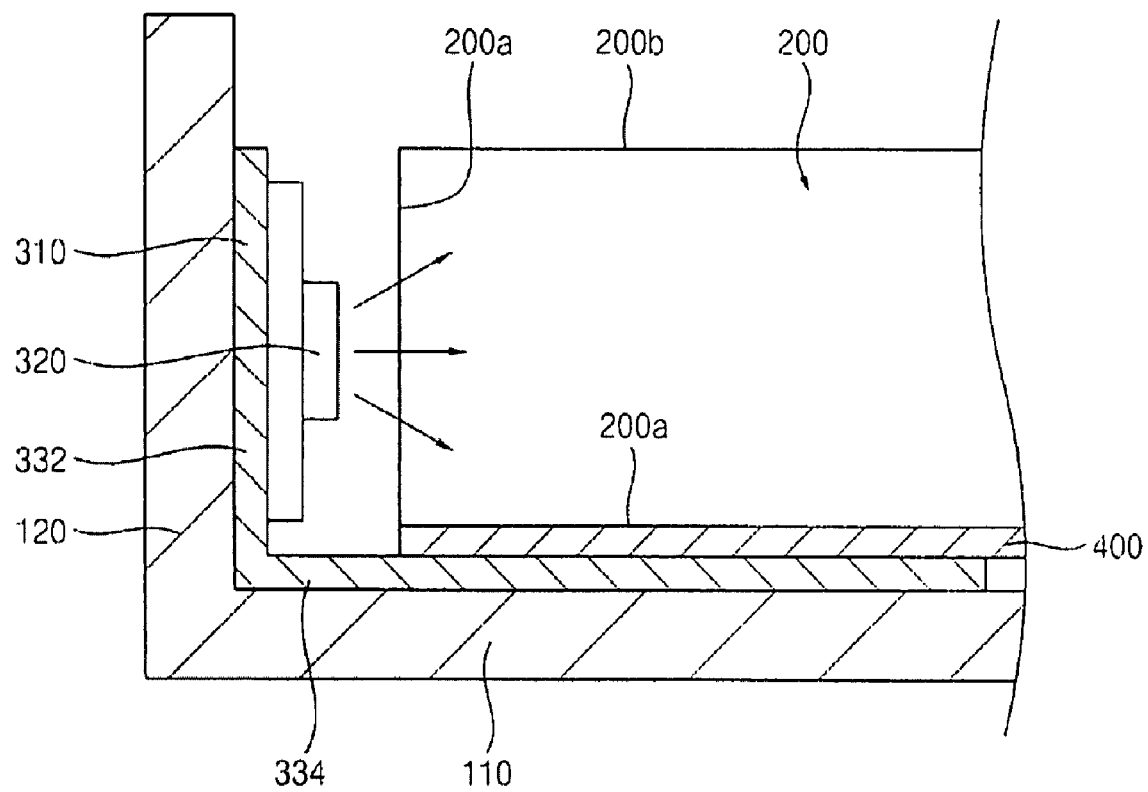
FIG. 7 is a partial cross-sectional view illustrating a backlight assembly illustrated in FIG. 6.

FIG. 6 is a perspective view illustrating a light generating unit and a light guiding plate of a display device according to an exemplary embodiment of the present invention. FIG. 7 is a partial cross-sectional view illustrating a backlight assembly illustrated in FIG. 6.

The display device according to an exemplary embodiment of the present invention is substantially the same as the display device of Embodiment 1 except for a flexible film 330. Thus, any further description concerning substantially the same parts will be omitted.

The flexible film 330 includes a connection wiring formed on a surface of the driving board 310 to provide a power source to the driving board 310. The flexible film 330 has flexibility, and has a larger area than the driving board 310.

The flexible film 330 includes a board-mounted portion 332, a extended portion 334 and a power connection portion 336.

The driving board 310 is mounted on a surface of the board-mounted portion 332. In an embodiment, first connection pads (not shown) are formed on a surface of the driving board 310, on which a light emitting chip 320 is not disposed, and second connection pads (not shown) are formed on a surface of the board-mounted portion 332, which faces the surface of the driving board 310, corresponding to the first connection pads. The first and second connection pads may be electrically connected to each other through, for example, lead (Pb) to electrically connect the driving board 310 and the board-mounted portion 332.

The extended portion 334 downwardly extends from the board-mounted portion 332. Since the flexible film 330 has flexibility, the extended portion 334 may be bent from the board-mounted portion 332. The extended portion 334 is, for example, substantially perpendicular to the board-mounted portion 332.

The extended portion 334 is bent substantially perpendicular to the board-mounted portion 332 to partially overlap the lower surface 200a of the light guiding plate 200. The extended portion 334 partially overlaps a reflective sheet 400 to be disposed under or beneath the reflective sheet 400. The reflective sheet 400 may be disposed between the extended portion 334 and the lower surface 200a of the light guiding plate 200.

The power connection portion 336 is electrically connected to at least one of the board-mounted portion 332 and the extended portion 334, and electrically connected to an externally provided power supply part (not shown). In an embodiment, the power connection portion 336 extends from the board-mounted portion 332 in the first direction. Alternatively, the power connection portion 336 may extend from the extended portion 334 in the first direction.

As described above, the extended portion 334 is bent substantially perpendicular to the board-mounted portion 332. Thus, a cross-section taken along a longitudinal direction of the flexible film 330 may have an L-shape.

A reflective layer (not shown) may be formed on a surface of the extended portion 334 to reflect light. The reflective layer reflects the light generated from the light emitting chip 320 to guide the reflected light to the side surface of the light guiding plate.

According to an exemplary embodiment of the present invention, a driving board having a light emitting chip is disposed substantially parallel with a side surface of a light guiding plate to face the side surface of the light guiding plate. Thus, a distance between the driving board and the light guiding plate may be reduced, thereby reducing a bezel size of a display device.

When the driving board is disposed substantially parallel with the side surface of the light guiding plate to face the side surface of the light guiding plate, an area for forming connection wirings may be reduced. In addition, the connection wirings are formed on a flexible film, instead of the driving board.

When the connection wirings are formed on the flexible film, and the driving board is formed on the flexible film to be electrically connected to the connection wirings, an area for forming the connection wirings may increase, thereby allowing the connection wirings to have a complicated structure.

Although exemplary embodiments of the present invention have been described herein with reference to the accompanying drawings, it is to be understood that the present invention should not be limited to those precise embodiments and that various other changes and modifications may be made by one of ordinary skill in the related art without departing from the scope or spirit of the invention. All such changes and modifications are intended to be included within the scope of the invention as defined by the appended claims.

What is claimed is:

1. A backlight assembly comprising:
   a light guiding plate;
   a driving board disposed substantially parallel with a side surface of the light guiding plate to face the side surface of the light guiding plate;
   a light emitting chip formed on a surface of the driving board to generate light toward the side surface of the light guiding plate; and
   a flexible film having a connection wiring that transmits power from a power source to the driving board, wherein the driving board is disposed on the flexible film, the flexible film comprises a board-mounted portion on which the driving board is disposed and an extended portion extending from the board-mounted portion, and the extended portion is bent substantially perpendicular to the board-mounted portion.

2. The backlight assembly of claim 1, wherein the flexible film has a larger area than the driving board.

3. The backlight assembly of claim 2, wherein the connection wiring is formed on the board-mounted portion and the extended portion.

4. The backlight assembly of claim 3, wherein the flexible film further comprises a power connection portion that is electrically connected to at least one of the board-mounted portion and the extended portion, and electrically connected to an externally provided power supply part.

5. The backlight assembly of claim 4, wherein the light emitting chips comprise white light emitting chips.

6. The backlight assembly of claim 1, wherein the extended portion overlaps a lower surface of the light guiding plate.

7. The backlight assembly of claim 6, further comprising a reflective sheet disposed between the lower surface of the light guiding plate and the extended portion.

8. The backlight assembly of claim 1, wherein the extended portion comprises:
   a first sub extended portion overlapping a lower surface of the light guiding plate; and
   a second sub extended portion overlapping an upper surface of the light guiding plate.

9. The backlight assembly of claim 1, further comprising a reflective layer formed on the extended portion.

10. The backlight assembly of claim 1, further comprising a plurality of light emitting chips linearly formed along a longitudinal direction of the driving board.

11. The backlight assembly of claim 10, wherein the light emitting chips are electrically connected in at least one of series and parallel through the connection wiring.

12. The backlight assembly of claim 11, wherein the light emitting chips comprise red light emitting chips, green light emitting chips and blue light emitting chips, and the red, green and blue light emitting chips are disposed on the driving board by turns, along the longitudinal direction of the driving board.

13. The backlight assembly of claim 12, wherein the red light emitting chips are electrically connected in at least one of series and parallel through the connection wiring, the green light emitting chips are electrically connected in at least one of series and parallel through the connection wiring, and the blue light emitting chips are electrically connected in at least one of series and parallel through the connection wiring.

14. The backlight assembly of claim 1, wherein the driving board has flexibility.

15. The backlight assembly of claim 1, wherein a width of the driving board is less than or substantially equal to a thickness of the light guiding plate.

16. The backlight assembly of claim 1, wherein the light guiding plate has a plate shape.

17. A display device comprising:
   a display panel; and
   a backlight assembly to provide light to the display panel, the backlight assembly comprising:
      a light guiding plate;
      a driving board disposed substantially parallel with a side surface of the light guiding plate to face the side surface of the light guiding plate;
      a light emitting chip formed on a surface of the driving board to generate light toward the side surface of the light guiding plate; and
      a flexible film having a connection wiring that transmits power from a power source to the driving board, wherein the driving board is disposed on the flexible film, the flexible film comprises a board-mounted portion on which the driving board is disposed and an extended portion extending from the board-mounted portion, and the extended portion is bent substantially perpendicular to the board-mounted portion.

18. The display device of claim 17, wherein the flexible film has a larger area than the driving board.

19. The display device of claim 18, wherein the connection wiring is formed on the board-mounted portion and the extended portion.

20. The display device of claim 17, wherein a width of the driving board is less than or substantially equal to a thickness of the light guiding plate.

* * * * *